United States Patent
Cook

(10) Patent No.: US 11,431,921 B2
(45) Date of Patent: Aug. 30, 2022

(54) MM-WAVE SHORT FLAT-FIELD SCHMIDT IMAGER USING ONE OR MORE DIFFRACTION GRATING(S) AND/OR FRESNEL LENS(S)

(71) Applicant: RAYTHEON COMPANY, Waltham, MA (US)

(72) Inventor: Lacy G. Cook, El Segundo, CA (US)

(73) Assignee: RAYTHEON COMPANY, Waltham, MA (US)

( * ) Notice: Subject to any disclaimer, the term of this patent is extended or adjusted under 35 U.S.C. 154(b) by 256 days.

(21) Appl. No.: 16/735,105

(22) Filed: Jan. 6, 2020

(65) Prior Publication Data

US 2021/0211589 A1    Jul. 8, 2021

(51) Int. Cl.
*H04N 5/30* (2006.01)

(52) U.S. Cl.
CPC ................... *H04N 5/30* (2013.01)

(58) Field of Classification Search
CPC ....................................................... H04N 5/30
See application file for complete search history.

(56) References Cited

U.S. PATENT DOCUMENTS

| 2,547,416 | A | 4/1951 | Skellett |
| 3,430,248 | A | 2/1969 | Lightbrown |
| 4,507,551 | A | 3/1985 | Howard et al. |
| 4,695,139 | A | 9/1987 | Bagby et al. |
| 6,919,988 | B2 | 7/2005 | Cook |
| 7,933,067 | B1 | 4/2011 | Cook |
| 9,110,276 | B2 | 8/2015 | Cook |
| 9,535,258 | B1 | 1/2017 | Whiteaker |
| 9,565,372 | B2 | 2/2017 | Cook |
| 2003/0218801 | A1 | 11/2003 | Komiski et al. |
| 2006/0071876 | A1 | 4/2006 | Clymer et al. |

(Continued)

FOREIGN PATENT DOCUMENTS

| EP | 2738876 A1 | 6/2014 |
| FR | 1253878 A | 2/1961 |

(Continued)

OTHER PUBLICATIONS

International Search Report and Written Opinion in International Patent Application No. PCT/US2020/058878 dated Feb. 2, 2021.

(Continued)

*Primary Examiner* — Twyler L Haskins
*Assistant Examiner* — Fayez A Bhuiyan
(74) *Attorney, Agent, or Firm* — Lando & Anastasi, LLP

(57) ABSTRACT

A millimeter-wave optical imaging system including an imaging detector located at a focal plane of the optical imaging system, the imaging detector being responsive to electromagnetic radiation in wavelength range of approximately 5-50 millimeters, an immersion lens directly coupled to the imaging detector and configured to focus the electromagnetic radiation onto the imaging detector, wherein the focal plane is located on a planar surface of the immersion lens and the imaging detector is directly coupled to the planar surface, a positive power primary mirror configured to reflect the electromagnetic radiation towards the immersion lens, and one of a Fresnel lens or a diffraction grating configured to receive and direct the electromagnetic radiation towards the primary mirror.

20 Claims, 6 Drawing Sheets

(56) References Cited

U.S. PATENT DOCUMENTS

| | | | |
|---|---|---|---|
| 2008/0023632 A1 | 1/2008 | Ridgway et al. | |
| 2011/0025432 A1 | 2/2011 | Gagnon et al. | |
| 2011/0089286 A1* | 4/2011 | McCarthy | F41G 7/226 244/3.13 |
| 2011/0268868 A1 | 11/2011 | Dowski, Jr. et al. | |
| 2012/0026382 A1 | 2/2012 | Moskun | |
| 2013/0088714 A1 | 4/2013 | Terada et al. | |
| 2013/0257646 A1 | 10/2013 | Gopalsami et al. | |
| 2016/0057364 A1* | 2/2016 | Cook | G02B 17/0852 250/332 |
| 2019/0353888 A1 | 11/2019 | Pentico et al. | |

FOREIGN PATENT DOCUMENTS

| | | |
|---|---|---|
| GB | 602872 A | 6/1948 |
| WO | 9218893 A1 | 10/1992 |

OTHER PUBLICATIONS

Anonymous: "Fresnel Lens", Wikipedia, Nov. 9, 2019, XP055768073, Retrieved from the Internet: URL:https://en.wikipedia.org/w/index.php?title=Fresnel_lens&oldid=925357390 [retrieved on Jan. 22, 2021].

Anonymous: "Zone Plate", Wikipedia, Nov. 21, 2019, XP055768079, Retrieved from the Internet:URL:https://en.wikipedia.org/w/index.php?title=Zone plate&oldid=927313219 [retrieved on Jan. 22, 2021].

Linfoot et al., "On the Aberrations of The Field-Flattened Schmidt Camera", Monthly Notices of the Royal Astronomical Society, vol. No. 109, Jan. 1, 1949, pp. 535-556.

Lloyd Jones, "Reflective and Catadioptric Objectives", in Handbook of Optics, Second Edition, vol. 2, Chapter 18, McGraw-Hill (1995), p. 145.

International Search Report and Written Opinion in International Patent Application No. PCT/US2020/065657 dated Mar. 12, 2021.

* cited by examiner

Table of Optical Prescription

| Surface | Description | Rd | cc | Ad | Ae | Af | Ag | Thickness | Material |
|---|---|---|---|---|---|---|---|---|---|
| 1 | Stop, Corrector | Infinity | | | | | | 2.000 | n = 1.60 |
| 2 | | Infinity | | 2.864E-06 | 4.988E-10 | 1.342E-12 | -8.302E-17 | 31.018 | Air |
| 3 | Primary mirror | -55.063 | 0.66422 | 3.341E-07 | 6.632E-11 | 9.146E-14 | -1.567E-17 | -22.973 | Refl. |
| 4 | Immersion lens | -13.092 | 1.16828 | 5.128E-05 | -1.237E-06 | 2.242E-08 | -8.752E-11 | -6.066 | n = 1.60 |
| 5 | | Infinity | | | | | | 0.000 | n = 1.60 |
| 6 | Focal plane | Infinity | | | | | | 0.000 | n = 1.60 |

Units above are inches

Aperture diameter = 52.0 inches

Field of view diameter = 20.0 degrees

Image diameter = 8.0 inches

Wavelength = 5.0 mm

Real-ray focal length = 22.69 inches

Real-ray F-number = F/0.44

FIG. 5

MM-WAVE SHORT FLAT-FIELD SCHMIDT IMAGER USING ONE OR MORE DIFFRACTION GRATING(S) AND/OR FRESNEL LENS(S)

BACKGROUND

The millimeter-wave (mm-wave) region of the electromagnetic spectrum (wavelengths on the order of a few millimeters or centimeters, for example) is used for a variety of applications, including imaging systems. In some instances, optical-based mm-wave imaging systems may provide wide fields of view, fast optical speed, low aberrations, low distortion, low obscuration, and small physical size. However, some imaging applications are weight sensitive and the lenses included in such optical-based mm-wave imaging systems can increase the weight of the system significantly.

SUMMARY OF INVENTION

One aspect of the present disclosure is directed to a millimeter-wave optical imaging system including an imaging detector located at a focal plane of the optical imaging system, the imaging detector being responsive to electromagnetic radiation in wavelength range of approximately 5-50 millimeters, an immersion lens directly coupled to the imaging detector and configured to focus the electromagnetic radiation onto the imaging detector, wherein the focal plane is located on a planar surface of the immersion lens and the imaging detector is directly coupled to the planar surface, a positive power primary mirror configured to reflect the electromagnetic radiation towards the immersion lens, and a Fresnel lens configured to receive and direct the electromagnetic radiation towards the primary mirror, a system aperture stop being located on the Fresnel lens.

In one embodiment, the imaging detector may be a focal plane array sensor. In some embodiments, the primary mirror may be one of a spherical mirror, a conic mirror, and an aspheric mirror. In certain embodiments, a second surface of the immersion lens may be one of spherical, conic, and aspheric. In some embodiments, the immersion lens may be one of a Fresnel lens and a diffraction grating. In one embodiment, the imaging detector may be interposed between the immersion lens and the Fresnel lens. In various embodiments, the imaging detector may include a two-dimensional array of pixels, and wherein each pixel has a width approximately equal to one half a central operating wavelength of the system.

In some embodiments, the Fresnel lens may include a surface sag corresponding to optical path distance (OPD). In certain embodiments, the surface sag may increase by a nominal amount starting from a center location of the Fresnel lens and resets to zero at each location along the Fresnel lens where the OPD is equal to a wavelength of the electromagnetic radiation.

In various embodiments, the millimeter-wave optical imaging system further may include a transceiver coupled to the imaging detector, and wherein the imaging detector includes a two-dimensional array of pixels, a first pixel of the array being associated with a first communication channel of the transceiver, and a second pixel of the array being associated with a second communication channel of the transceiver.

Another aspect of the present disclosure is directed to a millimeter-wave optical imaging system including an imaging detector located at a focal plane of the optical imaging system, the imaging detector being responsive to electromagnetic radiation in wavelength range of approximately 5-50 millimeters, an immersion lens directly coupled to the imaging detector and configured to focus the electromagnetic radiation onto the imaging detector, wherein the focal plane is located on a planar surface of the immersion lens and the imaging detector is directly coupled to the planar surface, a positive power primary mirror configured to reflect the electromagnetic radiation towards the immersion lens, and a diffraction grating configured to receive and direct the electromagnetic radiation towards the primary mirror, a system aperture stop being located on the diffraction grating.

In one embodiment, the imaging detector may be a focal plane array sensor. In some embodiments, the primary mirror may be one of a spherical mirror, a conic mirror, and an aspheric mirror. In certain embodiments, a second surface of the immersion lens may be one of spherical, conic, and aspheric. In some embodiments, the immersion lens may be one of a Fresnel lens and a diffraction grating. In one embodiment, the imaging detector may be interposed between the immersion lens and the diffraction grating. In various embodiments, the imaging detector may include a two-dimensional array of pixels, and wherein each pixel has a width approximately equal to one half a central operating wavelength of the system.

In some embodiments, the diffraction grating may include a plurality of surface undulations corresponding to the wavelength of the electromagnetic radiation. In certain embodiments, the electromagnetic radiation may be directed or dispersed based on a spacing of the surface undulations to generate a desired wavefront phase.

In various embodiments, the millimeter-wave optical imaging system further may include a transceiver coupled to the imaging detector, and wherein the imaging detector includes a two-dimensional array of pixels, a first pixel of the array being associated with a first communication channel of the transceiver, and a second pixel of the array being associated with a second communication channel of the transceiver.

BRIEF DESCRIPTION OF THE DRAWINGS

Various aspects of at least one embodiment are discussed below with reference to the accompanying figures, which are not intended to be drawn to scale. The figures are included to provide illustration and a further understanding of the various aspects and embodiments, and are incorporated in and constitute a part of this specification, but are not intended as a definition of the limits of the invention. In the figures, each identical or nearly identical component that is illustrated in various figures is represented by a like numeral. For purposes of clarity, not every component may be labeled in every figure. In the figures:

FIG. 5 is a table showing an optical prescription of a millimeter-wave optical imaging system according to aspects described herein.

DETAILED DESCRIPTION

Imaging in the visible and infrared spectral bands is widely used for a variety of different applications. Aspects and embodiments described herein provide an optical imaging system that leverage advances in focal plane array (FPA) sensor technology that have extended the imaging capability of these sensors to the millimeter-wave (mm-wave) spectral band. For example, certain embodiments may use large, multi-element two-dimensional (2D) FPA sensors operating in the 5-50 mm wavelength range, with pixel sizes on the order of about a half wavelength. By extending imaging techniques used in the visible and/or infrared spectral bands, and leveraging the capability of newer FPA sensors, aspects and embodiments described herein may provide lightweight mm-wave optics having a wide field of view, compact optical form and fast optical speed.

It is to be appreciated that embodiments of the methods and apparatuses discussed herein are not limited in application to the details of construction and the arrangement of components set forth in the following description or illustrated in the accompanying drawings. The methods and apparatuses are capable of implementation in other embodiments and of being practiced or of being carried out in various ways. Examples of specific implementations are provided herein for illustrative purposes only and are not intended to be limiting. Also, the phraseology and terminology used herein is for the purpose of description and should not be regarded as limiting. The use herein of "including," "comprising," "having," "containing," "involving," and variations thereof is meant to encompass the items listed thereafter and equivalents thereof as well as additional items. References to "or" may be construed as inclusive so that any terms described using "or" may indicate any of a single, more than one, and all of the described terms.

One approach for providing mm-wave optics having a wide field of view, compact optical form and fast optical speed has been to use a Schmidt corrector in a short flat-field Schmidt imager. One such implementation is described in U.S. Pat. No. 9,565,372 to Cook titled "COMPACT SHORT FLAT-FIELD SCHMIDT OPTICS FOR MM-WAVE OPERATION," which is hereby incorporated herein by reference.

Figure 1:
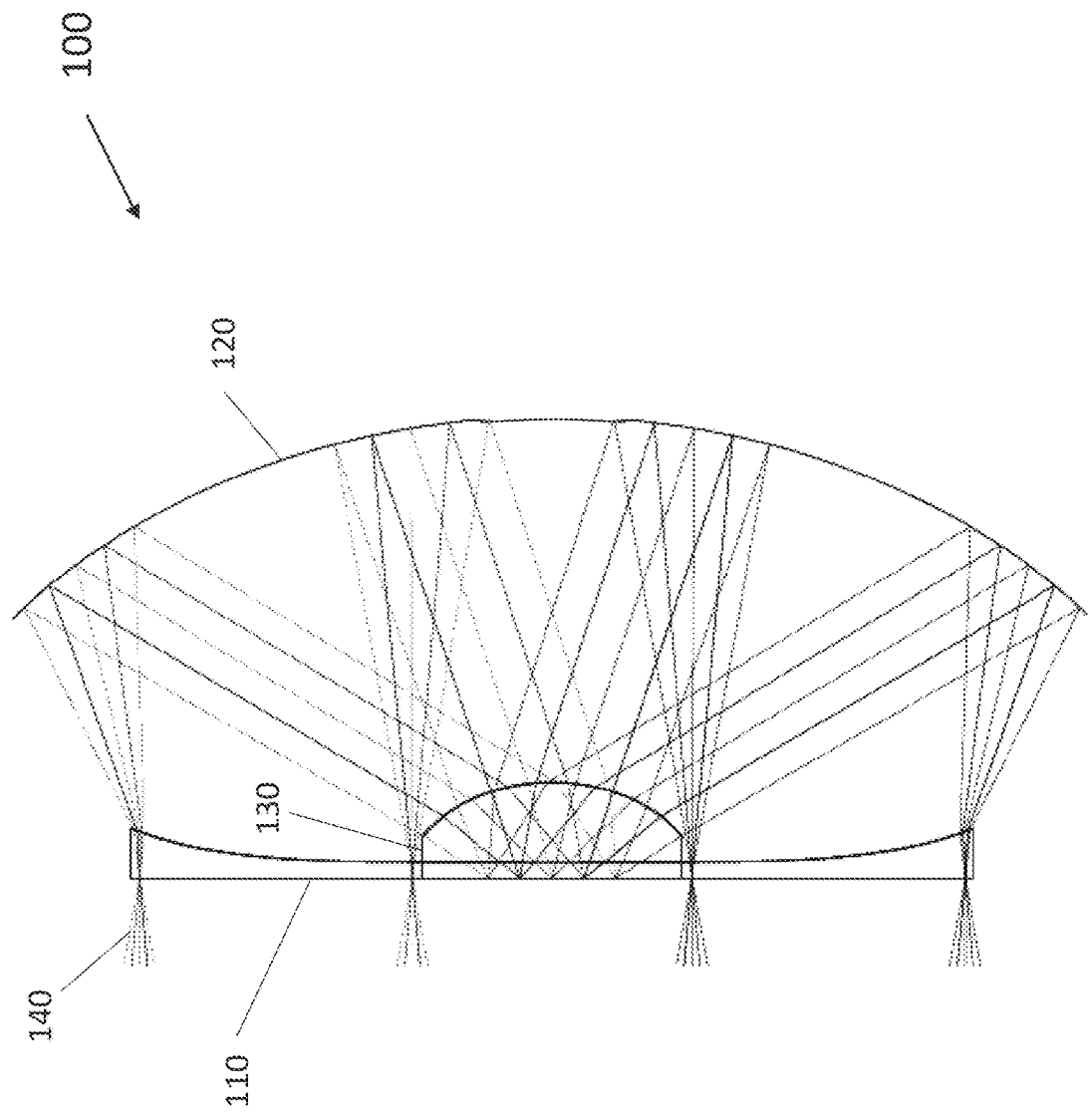
FIG. 1 is a diagram of one example of a millimeter-wave optical imaging system, as known in the art.

FIG. 1 illustrates an example optical imaging system generally indicated at 100. The optical system 100 has a short flat-field Schmidt optical form designed to image mm-wave electromagnetic radiation, in accordance with the above referenced U.S. Patent. The optical system 100 includes a full aperture Schmidt aspheric corrector 110, a primary mirror 120, and an immersion lens 130. Incident electromagnetic radiation 140 is directed by the Schmidt aspheric corrector 110 to the primary mirror 120 and is reflected off of the primary mirror 120 towards the immersion lens 130. The optical system 100 can provide the ability to achieve mm-wave imaging with fast optical speed, low aberrations, low distortion, low obscuration, and small physical size. However, many optical imaging applications are weight-sensitive, and the Schmidt aspheric corrector 110 can be excessively heavy, even when made from certain plastic materials (e.g., Rexolite®).

Accordingly, it is desirable to reduce excess weight associated with mm-wave optical imaging systems. As such, various aspects and examples described herein provide an improved, lightweight mm-wave optical imaging system. In at least one example, an optical imaging system includes one or more diffraction gratings and/or Fresnel lenses used in a short flat-field Schmidt imager. In some examples, the use of diffraction gratings and/or Fresnel lenses may maintain or improve performance of the optical imaging system while providing significant reductions in weight.

Figure 2:
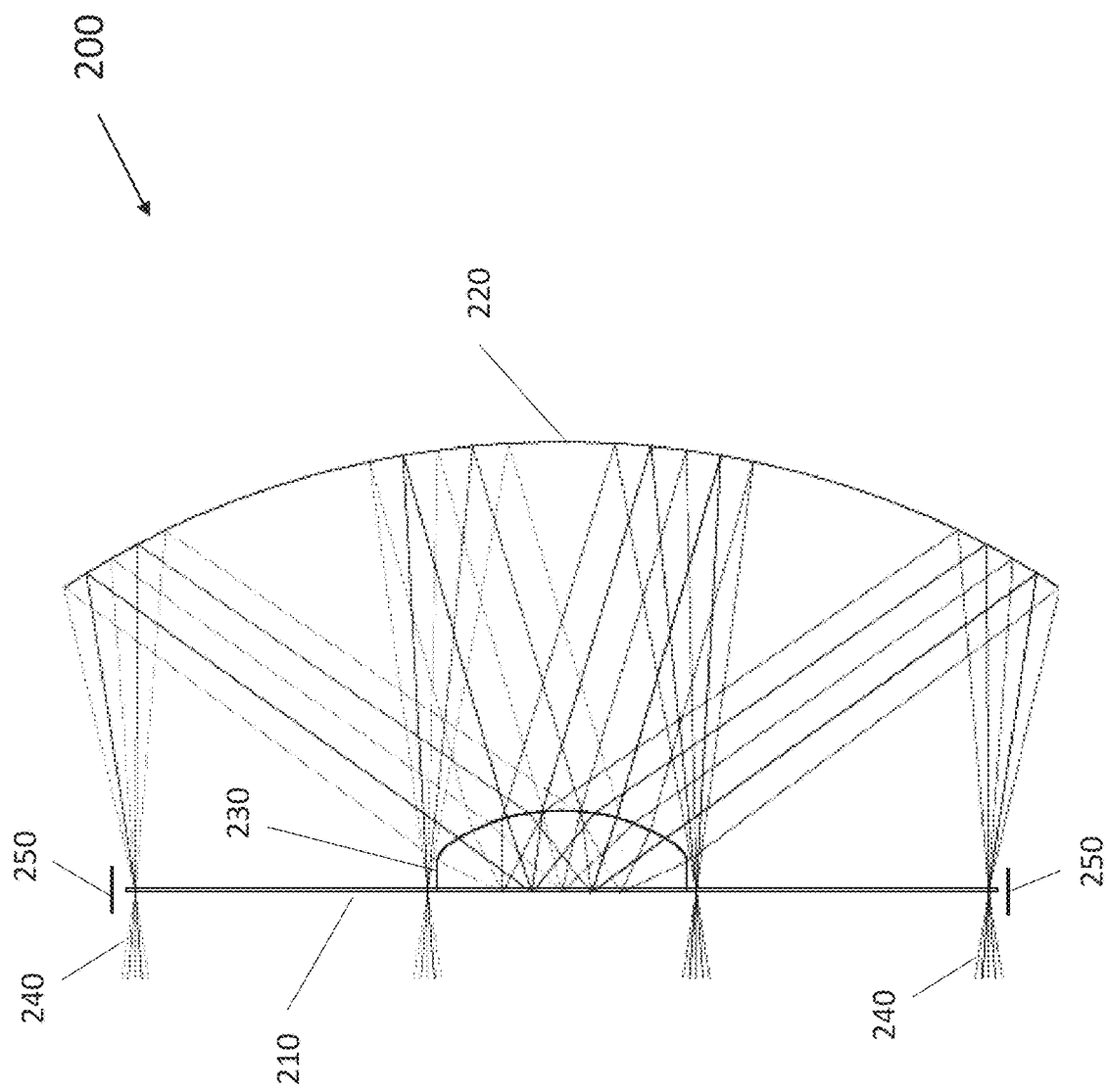
FIG. 2 is a diagram of a millimeter-wave optical imaging system in accordance with aspects described herein.

FIG. 2 illustrates an optical imaging system generally indicated at 200 in accordance with aspects described herein. The optical system 200 is catadioptric (meaning using both mirrors and lenses) and has a short flat-field Schmidt optical form designed to image mm-wave electromagnetic radiation. The optical system 200 includes three optical elements, namely, a planar corrector 210, a highly curved spherical or aspheric primary mirror 220, and an immersion lens 230. Incident electromagnetic radiation 240 is directed by the planar corrector 210 to the primary mirror 220 and is reflected off of the primary mirror 220 towards the immersion lens 230. The system aperture stop 250 is located on the edges of the planar corrector 210, as shown in FIG. 2. The immersion lens 230 acts as a field lens, and the system image plane is located on the rear surface of the immersion lens 230 (i.e., side facing the planar corrector 210).

The primary mirror 220 can be any reflecting surface of conventional design and construction capable of reflecting radiation at the desired wavelengths (mm-wave in the illustrative embodiment). For example, a metal coating (such as gold, aluminum, or silver) applied to any kind of substrate may be suitable to create the reflective surface.

As shown in FIG. 2, the planar corrector 210 may have a substantially flat aperture surface and may be thinner than other types of lenses having prominent surface curvatures (e.g., a Schmidt corrector). For example, the planar corrector 210 may be configured as a diffraction grating. As known to those skilled in the art, diffraction gratings are made from a periodic structure configured to split and direct electromagnetic radiation based on diffraction principles. In some examples, the periodic structure may be formed using undulations (e.g., ridges or rulings) on the surface of the planar corrector 210. The electromagnetic radiation may be directed or dispersed based on the spacing of the undulations and the wavelength of the electromagnetic radiation to generate a desired wavefront phase. In some examples, the undulations of the diffraction grating may appear only as small protrusions on the surface of the planar corrector 210, providing the substantially flat aperture surface.

In another example, the planar corrector 210 may be configured as a Fresnel lens. As known to those skilled in the art, Fresnel lenses are made from a set of concentric rings configured to direct electromagnetic radiation based on refraction principles. In some examples, each concentric ring may be separated by surface steps or sags.

Figure 3:
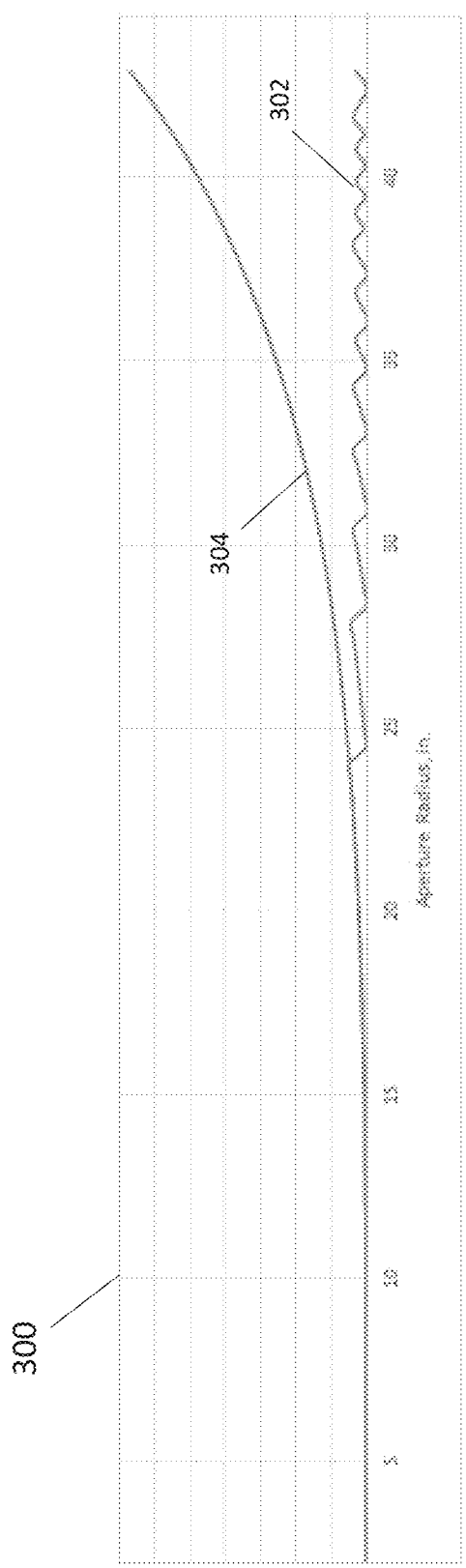
FIG. 3 is a graph illustrating particular lens surface parameters of a millimeter-wave optical imaging system in accordance with aspects described herein.

FIG. 3 illustrates an example of the surface sag of the planar corrector 210 in accordance with aspects described herein. The graph 300 includes a first trace 302 corresponding to the surface sag of the planar corrector 210 (configured as a Fresnel lens) and a second trace 304 corresponding to the surface curvature of a conventional Schmidt corrector for comparison. As shown by trace 302, the surface sag of the planar corrector 210 may have a nominal sag that is periodically reset to zero along the radius of the aperture surface. In some examples, the surface sag may be reset to zero at each point along the aperture radius where the optical path distance (OPD) is equal to one wavelength of the electromagnetic radiation; i.e., when the product of the refractive index of the planar corrector 210 and the length of the path followed by electromagnetic radiation through the system 200 is equal to one wavelength. As such, the surface sag may be reset to zero more frequently moving away from the center of the planar corrector 210. In some examples, the surface sag may appear only as small protrusions on the surface of the planar corrector 210, providing the substantially flat aperture surface.

Since the planar corrector 210 (configured as a diffraction grating or a Fresnel lens) has a substantially flat aperture surface, the planar corrector 210 may offer significant weight reductions compared to other types of lenses. For example, as shown in FIG. 3, the difference between the surface sag of the planar corrector 210 (i.e., trace 302) and the surface curvature of the conventional Schmidt corrector (i.e., trace 304) may correspond to a reduced weight of the planar corrector 210 when configured as a Fresnel lens. Likewise, although not shown, the planar corrector 210 may have a similar reduced weight when configured as a diffraction grating.

Figure 4:
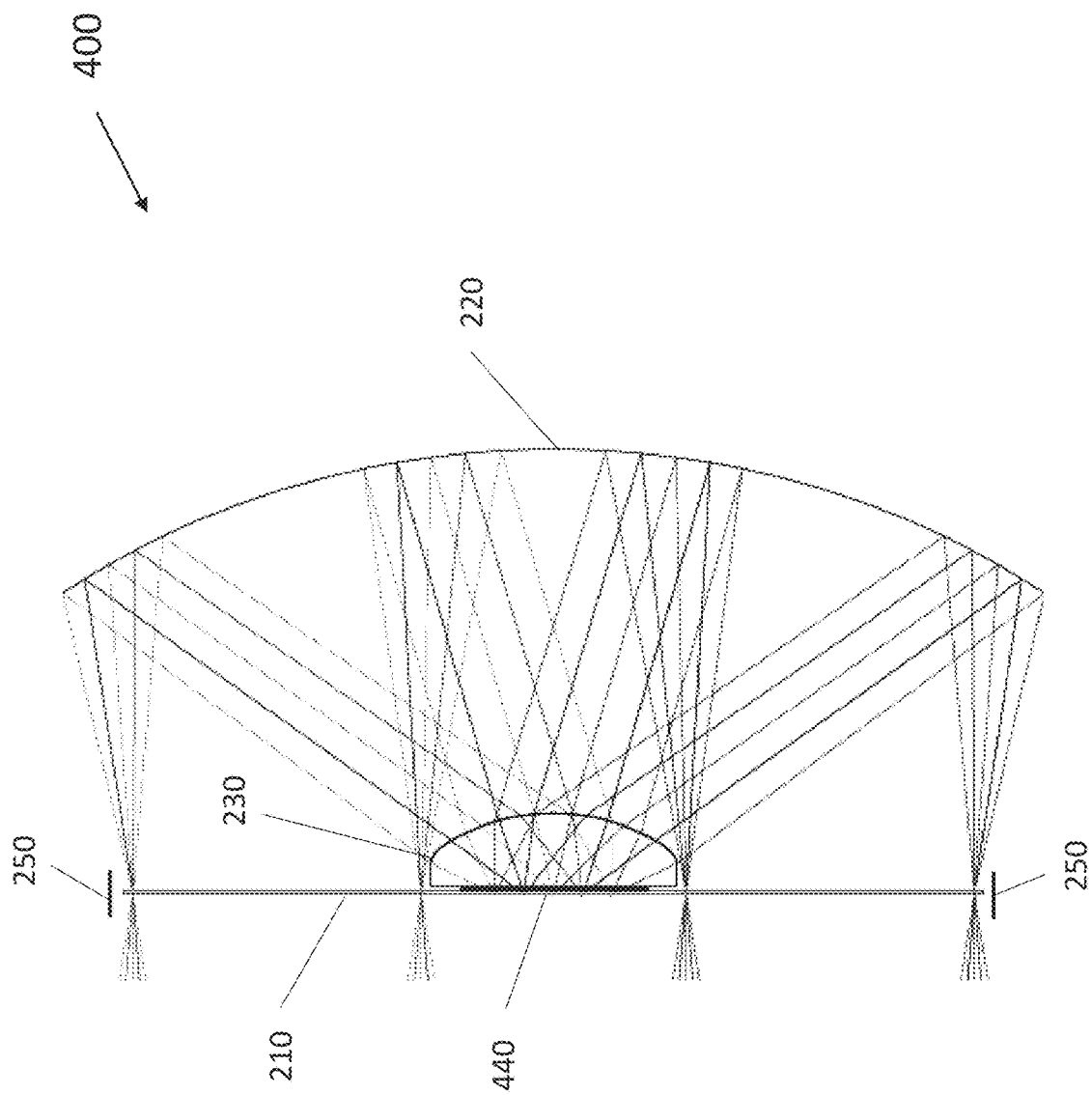
FIG. 4 is a diagram of a millimeter-wave optical imaging system in accordance with aspects described herein.

In some examples, the immersion lens 230 may also be configured as a Fresnel lens or a diffraction grating. In other examples, the immersion lens may be configured as a solid optical element having a near hemispherical surface and an opposing flat surface. In certain examples, the immersion lens 230 may be immediately attached to the planar corrector 210. In some examples, an FPA sensor, or another detector, may be attached to one side of the immersion lens 230. For example, as shown in FIG. 4, the optical imaging system generally indicated at 400 is substantially the same as the optical imaging system 200 of FIG. 2, except the optical imaging system 400 includes an imaging sensor 440 attached directly to the immersion lens 230, between the immersion lens 230 and the planar corrector 210. In other examples, the imaging sensor 440 may arranged differently (e.g., attached to the other side of the planar corrector 210). The use of the immersion lens 230 may allow a smaller detector (e.g., imaging sensor 440) to collect the same amount of radiation as would a larger detector in air. For example, the dimensions (i.e., diameter) of the imaging sensor 440 may be smaller than the immersion lens 230; however, in other examples the dimensions of the imaging sensor 440 may be equal to or larger than the immersion lens 230. In some examples, the minimum dimensions of the imaging sensor 440 may correspond to the size of the image. In addition, use of the immersion lens 230 may flatten the field and correct for otherwise present, and potentially severe, comatic and astigmatic aberrations in the system.

In one example, the optical configurations of FIGS. 2 and 4, e.g., optical imaging systems 200, 400, respectively, and in accord with various other embodiments, are highly robust with respect to the refractive index, $n_{il}$, of the material of the immersion lens 230. This is at least in part due to the placement of the immersion lens 230 at/near the image plane, and because the electromagnetic radiation does not travel outside of the lens once it enters the lens (as discussed above, the FPA sensor, e.g., imaging sensor 440, may be directly attached to a surface of the lens). Ray trace simulations have demonstrated that the refractive index, $n_{il}$, may vary over a range of values, for example, approximately 1.6-4.0, and still yield good image quality. Table 1 provides these results. In Table 1, all linear units are inches, and all examples have a system effective focal length (EFL) of 22.7 inches.

TABLE 1

| $n_{il}$ | EFL lens | Rd mirror | n*(EFL lens) | EFL mirror | Petz. Rd |
|---|---|---|---|---|---|
| 1.8 | 17.78 | 56.58 | 32.004 | 28.29 | −243.778 |
| 2.2 | 14.31 | 57.22 | 31.482 | 28.61 | −313.614 |
| 2.8 | 11.44 | 59.2 | 32.032 | 29.6 | −389.863 |
| 3.4 | 9.58 | 60.81 | 32.572 | 30.405 | −457.015 |
| 4.0 | 8.42 | 62.23 | 33.68 | 31.115 | −408.559 |

In Table 1, "EFL lens" is the effective focal length of the immersion lens 230; "Rd mirror" is the radius of the primary mirror 220; "EFL mirror" is the effective focal length of the primary mirror 220, and "Petz. Rd." is the Petzval radius or field curvature. It is highly desirable that the radius of the Petzval be very large if not near infinity, indicating that there is little or no field curvature residual in the overall design.

In some examples, the robustness of the optical design may allow a wide variety of different materials to be used for the planar corrector 210 and the immersion lens 230. Some examples of suitable materials for the lenses 210, 230 include, but are not limited to, nylon, Rexolite®, various plastics, metamaterials, silicon, glass, Germanium, and Sapphire. In certain applications, the use of a metamaterial composed of a dipole loaded plastic foam may be advantageous in that the plastic foam is very lightweight. A lattice of dipoles, generally metals, may be disposed throughout the plastic foam and customized so as to provide a specified refractive index while minimizing the density of the material so as to preserve the lightweight characteristic of the plastic foam.

As discussed above, embodiments of the optics have demonstrated robustness in ability to yield excellent performance with field/immersion lens materials with a refractive index ranging from approximately 1.6 to 4.0. As will be appreciated by those skilled in the art, there are numerous degrees of freedom available for optimization of the design, even though the optics may include only three elements, namely, the planar corrector 210, the primary mirror 220, and the immersion lens 230. The detailed figures or shapes of the surface of the optical elements are at the designer's discretion. In a preferred embodiment, the optical elements are rotationally symmetric. They may be spherical, conic sections, or rotationally symmetric aspheres. The surfaces in addition to having net positive or negative power by nature of their configuration may also have conic or aspheric departures. Given the benefit of this disclosure, optimization of the design, including surface and material selection/configuration, may be performed using design and simulation tools readily available to and commonly used by those skilled in the art.

FIG. 5 is a table providing an optical prescription for an illustrative embodiment of the optical system of the present invention. In one example, the entrance aperture is 52.0 inches diameter and the focal length is 22.69 inches. The system optical speed is F/0.44 and the field of view is 20.0 degrees in diameter. In some examples, the configuration of the planar corrector 210 (i.e., Fresnel lens or diffraction grating) may determine the field of view range. For example, the Fresnel lens configuration may provide a broader field of view, and as such, may be advantageously used in wide bandwidth applications. The optical prescription for this illustrative embodiment may be generated using an equation which is an industry standard and which would be known to those skilled in the art. In the table of FIG. 5, the column designated Rd is the radius in inches of the specific surfaces. The minus sign indicates that the center of curvature is to the left of the mirror surface. The column designated cc is the conic constant which is equal to the negative squared value of the eccentricity of a conic section (a planar cut through a double sheeted conic surface). The columns designated Ad, Ae, Af and Ag are the aspheric constants of the specific surfaces.

Figure 6:
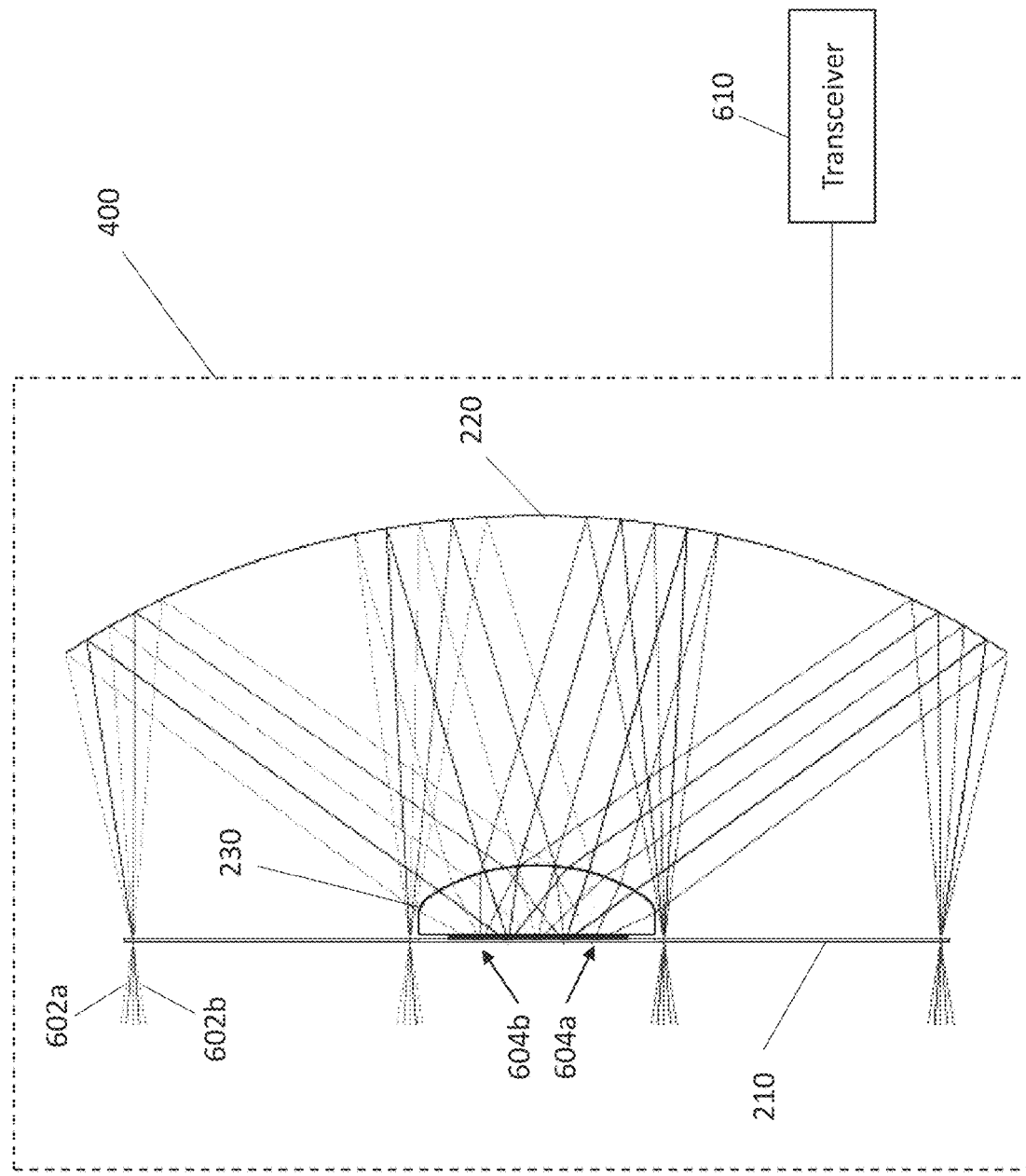
FIG. 6 is a diagram of a communication system incorporating a millimeter-wave optical imaging system according to aspects described herein.

In one example, because the optical system is an imaging system, each ray of electromagnetic radiation entering via the system aperture stop from a given fixed direction is imaged onto a pixel of an imaging detector array (e.g., imaging sensor 440). Pixel selection is a function of the angle of incidence of the rays at the system aperture (i.e., on the planar corrector 210), as indicated by well-known first-order imaging equations. Thus, referring to FIG. 6, a ray/signal 602a from a particular object point, for example, will be received at a first angle of incidence, and thus imaged onto a first region of the detector array generally indicated at 604a (corresponding to first pixel); where as a ray/signal 602b from a different object point will be received at a different angle of incidence, and thus imaged onto a second detector region/pixel generally indicated at 604b. As a result, the detector array may be coupled to a transceiver 610, and different pixels of the array may be correlated to different channels of a communication system, such that the optical system can be used to simultaneously transmit/receive mm-wave signals over multiple channels, without requiring multiplexing or other techniques typically associated with multi-channel communication systems.

Accordingly, various aspects and examples described herein provide an improved, lightweight mm-wave optical imaging system. Specifically, the optical imaging system includes one or more diffraction gratings and/or Fresnel lenses used in a short flat-field Schmidt imager to maintain or improve performance of the optical imaging system while providing significant reductions in weight.

Having described above several aspects of at least one embodiment, it is to be appreciated various alterations, modifications, and improvements will readily occur to those skilled in the art. Such alterations, modifications, and improvements are intended to be part of this disclosure and are intended to be within the scope of the invention. Accordingly, the foregoing description and drawings are by way of example only, and the scope of the invention should be determined from proper construction of the appended claims, and their equivalents.

What is claimed is:

1. A millimeter-wave optical imaging system comprising:
   an imaging detector located at a focal plane of the optical imaging system, the imaging detector being responsive to electromagnetic radiation in wavelength range of approximately 5-50 millimeters;
   an immersion lens directly coupled to the imaging detector and configured to focus the electromagnetic radiation onto the imaging detector, wherein the focal plane is located on a planar surface of the immersion lens and the imaging detector is directly coupled to the planar surface;
   a positive power primary mirror configured to reflect the electromagnetic radiation towards the immersion lens; and
   a Fresnel lens configured to receive and direct the electromagnetic radiation towards the primary mirror, a system aperture stop being located on the Fresnel lens.

2. The millimeter-wave optical imaging system of claim 1, wherein the imaging detector is a focal plane array sensor.

3. The millimeter-wave optical imaging system of claim 1, wherein the primary mirror is one of a spherical mirror, a conic mirror, and an aspheric mirror.

4. The millimeter-wave optical imaging system of claim 1, wherein a second surface of the immersion lens is one of spherical, conic, and aspheric.

5. The millimeter-wave optical imaging system of claim 1, wherein the immersion lens is one of a Fresnel lens and a diffraction grating.

6. The millimeter-wave optical imaging system of claim 1, wherein the imaging detector is interposed between the immersion lens and the Fresnel lens.

7. The millimeter-wave optical imaging system of claim 1, wherein the imaging detector includes a two-dimensional array of pixels, and wherein each pixel has a width approximately equal to one half a central operating wavelength of the system.

8. The millimeter-wave optical imaging system of claim 1, wherein the Fresnel lens includes a surface sag corresponding to optical path distance (OPD).

9. The millimeter-wave optical imaging system of claim 8, wherein the surface sag increases by a nominal amount starting from a center location of the Fresnel lens and resets to zero at each location along the Fresnel lens where the OPD is equal to a wavelength of the electromagnetic radiation.

10. The millimeter-wave optical imaging system of claim 1, further comprising a transceiver coupled to the imaging detector; and
   wherein the imaging detector includes a two-dimensional array of pixels, a first pixel of the array being associated with a first communication channel of the transceiver, and a second pixel of the array being associated with a second communication channel of the transceiver.

11. A millimeter-wave optical imaging system comprising:
   an imaging detector located at a focal plane of the optical imaging system, the imaging detector being responsive to electromagnetic radiation in wavelength range of approximately 5-50 millimeters;
   an immersion lens directly coupled to the imaging detector and configured to focus the electromagnetic radiation onto the imaging detector, wherein the focal plane is located on a planar surface of the immersion lens and the imaging detector is directly coupled to the planar surface;
   a positive power primary mirror configured to reflect the electromagnetic radiation towards the immersion lens; and
   a diffraction grating configured to receive and direct the electromagnetic radiation towards the primary mirror, a system aperture stop being located on the diffraction grating.

12. The millimeter-wave optical imaging system of claim 11, wherein the imaging detector is a focal plane array sensor.

13. The millimeter-wave optical imaging system of claim 11, wherein the primary mirror is one of a spherical mirror, a conic mirror, and an aspheric mirror.

14. The millimeter-wave optical imaging system of claim 11, wherein a second surface of the immersion lens is one of spherical, conic, and aspheric.

15. The millimeter-wave optical imaging system of claim 11, wherein the immersion lens is one of a Fresnel lens and a diffraction grating.

16. The millimeter-wave optical imaging system of claim 11, wherein the imaging detector is interposed between the immersion lens and the diffraction grating.

17. The millimeter-wave optical imaging system of claim 11, wherein the imaging detector includes a two-dimensional array of pixels, and wherein each pixel has a width approximately equal to one half a central operating wavelength of the system.

18. The millimeter-wave optical imaging system of claim 11, wherein the diffraction grating includes a plurality of surface undulations corresponding to the wavelength of the electromagnetic radiation.

19. The millimeter-wave optical imaging system of claim 18, wherein the electromagnetic radiation is directed or dispersed based on a spacing of the surface undulations to generate a desired wavefront phase.

20. The millimeter-wave optical imaging system of claim 11, further comprising a transceiver coupled to the imaging detector; and wherein the imaging detector includes a two-dimensional array of pixels, a first pixel of the array being associated with a first communication channel of the transceiver, and a second pixel of the array being associated with a second communication channel of the transceiver.

\* \* \* \* \*